(12) United States Patent
Durrant et al.

(10) Patent No.: US 10,646,088 B2
(45) Date of Patent: May 12, 2020

(54) TRUCK MOUNTED CLEANING SYSTEM

(71) Applicant: Harris Research, Inc., Logan, UT (US)

(72) Inventors: Edward E. Durrant, Paradise, UT (US); Monte G. Taylor, Logan, UT (US)

(73) Assignee: Harris Research, Inc., Nashville, TN (US)

( * ) Notice: Subject to any disclaimer, the term of this patent is extended or adjusted under 35 U.S.C. 154(b) by 573 days.

(21) Appl. No.: 13/621,788

(22) Filed: Sep. 17, 2012

(65) Prior Publication Data
US 2013/0205533 A1 Aug. 15, 2013

Related U.S. Application Data

(60) Provisional application No. 61/535,171, filed on Sep. 15, 2011.

(51) Int. Cl.
*A47L 11/34* (2006.01)
*B60P 3/14* (2006.01)
*A47L 11/40* (2006.01)

(52) U.S. Cl.
CPC ........... *A47L 11/34* (2013.01); *A47L 11/4083* (2013.01); *B60P 3/14* (2013.01); *F01P 2060/00* (2013.01)

(58) Field of Classification Search
None
See application file for complete search history.

(56) References Cited

U.S. PATENT DOCUMENTS

| | | | |
|---|---|---|---|
| 2,591,093 A | 4/1952 | Okun | |
| 2,801,437 A | 8/1957 | Okun | |
| 2,999,258 A | 9/1961 | Berberian | |
| 3,101,505 A | 8/1963 | Belicka et al. | |
| 3,189,930 A | 6/1965 | Tuthill, Jr. | |
| 3,277,507 A | 10/1966 | Sassano, Sr. | |
| 3,812,552 A * | 5/1974 | Blackmon | A47L 11/34 15/321 |
| 4,000,538 A | 1/1977 | Tissier | |
| 4,109,340 A | 4/1978 | Bates | |
| 4,146,944 A | 4/1979 | Pinto | |
| 4,182,001 A | 1/1980 | Krause | |
| 4,191,590 A | 3/1980 | Sundeim | |
| 4,200,951 A | 5/1980 | Burgoon et al. | |
| 4,284,127 A | 8/1981 | Collier et al. | |
| 4,317,439 A * | 3/1982 | Emmerling | F01P 3/20 123/563 |
| 4,443,909 A * | 4/1984 | Cameron | A47L 11/34 15/320 |
| 4,485,519 A | 12/1984 | Collier | |

(Continued)

OTHER PUBLICATIONS

PCT/US2012/055818, Written Opinion and International Search Report, dated Dec. 28, 2013.

*Primary Examiner* — Brian D Keller

(57) ABSTRACT

A cleaning system is disclosed that includes a vehicle that has a cooling system for circulating a coolant, a diverter coupled with the cooling system that is configured to divert the coolant through a heat exchanger, a pump configured to pump a cleaning solution through the heat exchanger so that the heat exchanger heats the cleaning solution without mixing the coolant and the cleaning solution, and a rotary head cleaner in fluid communication with the heat exchanger for receiving the cleaning solution and applying the cleaning solution to a floor.

8 Claims, 6 Drawing Sheets

(56) References Cited

U.S. PATENT DOCUMENTS

| | | | | |
|---|---|---|---|---|
| 4,691,668 A | * | 9/1987 | West | F01P 5/04 |
| | | | | 123/41.12 |
| 4,949,424 A | * | 8/1990 | Shero | A47L 11/34 |
| | | | | 15/321 |
| 4,998,314 A | | 3/1991 | Borofsky | |
| 5,027,470 A | | 7/1991 | Takashima | |
| 5,463,791 A | | 11/1995 | Roden | |
| 5,522,114 A | | 6/1996 | Allison | |
| 5,706,549 A | | 1/1998 | Legatt et al. | |
| 5,826,298 A | * | 10/1998 | Rohrbacher et al. | 15/321 |
| 6,151,748 A | | 11/2000 | Earhart, Jr. et al. | |
| 6,675,437 B1 | | 1/2004 | York | |
| 7,070,662 B2 | | 7/2006 | Studebaker | |
| 2003/0062430 A1 | | 4/2003 | Cook | |
| 2007/0113368 A1 | | 5/2007 | Alexander | |
| 2007/0209141 A1 | | 9/2007 | Hare | |
| 2007/0251047 A1 | | 11/2007 | Monson | |
| 2008/0149317 A1 | * | 6/2008 | Baker | F28D 7/022 |
| | | | | 165/163 |
| 2009/0078290 A1 | | 3/2009 | Addicks et al. | |
| 2009/0114380 A1 | * | 5/2009 | Grabon | F28D 7/0033 |
| | | | | 165/181 |

\* cited by examiner

TRUCK MOUNTED CLEANING SYSTEM

CROSS-REFERENCES TO RELATED APPLICATIONS

This application claims the benefit of U.S. Provisional Patent Application No. 61/535,171 entitled "TRUCK MOUNT ROTARY HEAD CLEANER" and filed on Sep. 15, 2011 for Edward E. Durrant et al., which is incorporated herein by reference.

FIELD

This disclosure relates to portable cleaning devices and more particularly relates to truck mounted cleaning systems.

BACKGROUND

The cleaning of carpet, to remove stains, dirt, etc., is achieved using various different methods, including dry-cleaning techniques, wet-cleaning techniques, and vacuuming. Wet-cleaning, or steam cleaning as it is commonly known, is a technique that involves spraying heated water onto carpet, agitation of the carpet, and extraction of the heated water. The extraction step may require several passes with a cleaning tool to extract water from the carpet before allowing the carpet to air-dry.

Unfortunately, many of the conventional cleaning tools used to extract water from the carpet are bulky, cumbersome and inefficient. Thus, even after several passes with the cleaning tool, a substantial amount of water remains in/on the carpet and the carpet must be left to air-dry for many hours. Furthermore, motors that provide the vacuum suction to the cleaning tool are often located remotely, and therefore suffer from a loss of suction power over the length of the suction hose. Additionally, since cleaning process generally utilize heated water and/or heated chemicals, conventional cleaning systems may include inefficient heating means.

SUMMARY

From the foregoing discussion, it should be apparent that a need exists for a cleaning system that efficiently heats a cleaning solution and effectively extracts liquid from carpets.

The subject matter of the present application has been developed in response to the present state of the art, and in particular, in response to the problems and needs in the art that have not yet been fully solved by currently available cleaning systems. Accordingly, the present disclosure has been developed to provide a system that overcomes many or all of the above-discussed shortcomings in the art.

The present disclosure relates to a cleaning system that includes a vehicle that has a cooling system for circulating a coolant, a diverter coupled with the cooling system that is configured to divert the coolant through a heat exchanger, a pump configured to pump a cleaning solution through the heat exchanger so that the heat exchanger heats the cleaning solution without mixing the coolant and the cleaning solution, and a rotary head cleaner in fluid communication with the heat exchanger for receiving the cleaning solution and applying the cleaning solution to a floor.

In one implementation, the rotary head cleaner also includes a vacuum for extracting the cleaning solution from the floor and a pump for pushing the extracted cleaning solution to a waste tank on the vehicle. The rotary head cleaner further may further include an evacuation tank that receives the vacuumed cleaning solution before the cleaning solution is pumped to the waste tank on the vehicle. The evacuation tank evenly distributes weight across the rotary head cleaner and improves the lateral balance of the rotary head cleaner.

The pump is configured to push cleaning solution to the rotary head cleaner. A second pump may also be used and may be configured to push cleaning solution to the rotary head cleaner. The system may also include at least one cleaning solution tank. In one implementation, a re-circulating hose is attached between the heat exchanger and the at least one cleaning solution tank to bypass the rotary head cleaner. Other hoses for coupling the vehicle with the rotary head cleaner may be implemented, where the hoses are formed having smooth inner wall surfaces.

The heat exchanger in the system may be able to heat the cleaning solution to a temperature in the range of between about 165 and 205 degrees Fahrenheit. In another embodiment, the heat exchanger heats the cleaning solution to a temperature in the range of between about 175 and 195 degrees Fahrenheit. The heat exchanger may be able to manage heating the cleaning solution at flow rates of between about 0.25 and 0.75 gallons per minute. In another example, the flow rate is about 0.5 gallons per minute.

The cleaning system may also include a vehicle having a cooling system for circulating a coolant, a diverter coupled with the cooling system configured to divert the coolant through a heat exchanger, at least one cleaning solution tank, a pump configured to pump a cleaning solution from the at least one cleaning solution tank to the heat exchanger so that the heat exchanger heats the cleaning solution without mixing the coolant and the cleaning solution, and hoses coupling the heat exchanger to a rotary head cleaner for applying the cleaning solution to a floor and extracting liquid from the floor. In one embodiment, the at least one cleaning solution tank is mounted on a portable base.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided to give a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure. Reference will now be made to the figures, in which like numerals refer to like parts throughout.

Figure 1:
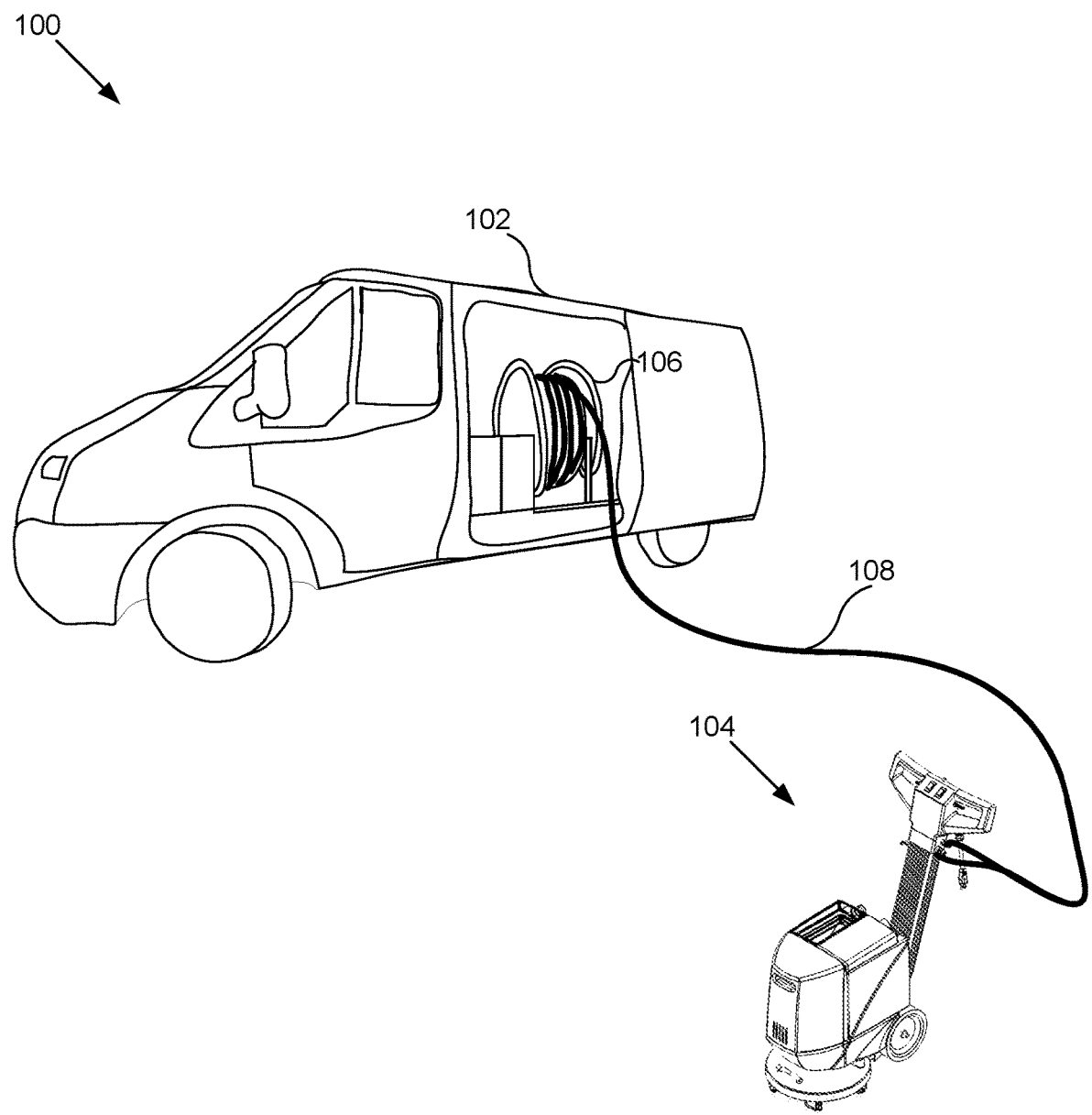
FIG. 1 is a perspective view diagram illustrating one embodiment of a truck mount rotary head cleaner system.

FIG. 1 is a perspective view diagram illustrating one embodiment of a truck mount rotary head cleaner system 100 (hereinafter "system"). The system 100 includes a truck, van, or other vehicle 102 connected with a rotary head cleaner 104. The vehicle 102 includes a hose reel 106 for fluidly connecting the vehicle 102 with the rotary head cleaner 104. The hose reel 106 is capable of maintaining a supply hose, a waste hose, and power cords for connecting the cleaner 104 to supply tanks and waste tanks within the vehicle 102, and electrical power.

The supply hose and waste hose are depicted in FIG. 1 as a bundle 108 fluidly connecting the cleaner 104 with the vehicle 102. In one embodiment, both supply fluids and waste fluids are "pushed" from a source to a destination. In other words, a vacuum is not utilized to transport fluids between the vehicle 102 and the cleaner 104. Pumps (not shown here) push cleaning fluid from the vehicle 102 to the cleaner 104 and waste or evacuated fluids from the cleaner 104 to the vehicle 102. As such, ribbed or reinforced hoses are not required and therefore resistance to the movement of fluids is greatly reduced and consequently, the energy required to move the fluids is also reduced. Conversely, in a system that utilizes vacuum, ribbed or reinforced hoses are a necessity because the force of the vacuum can cause the hose to collapse.

Figure 2:
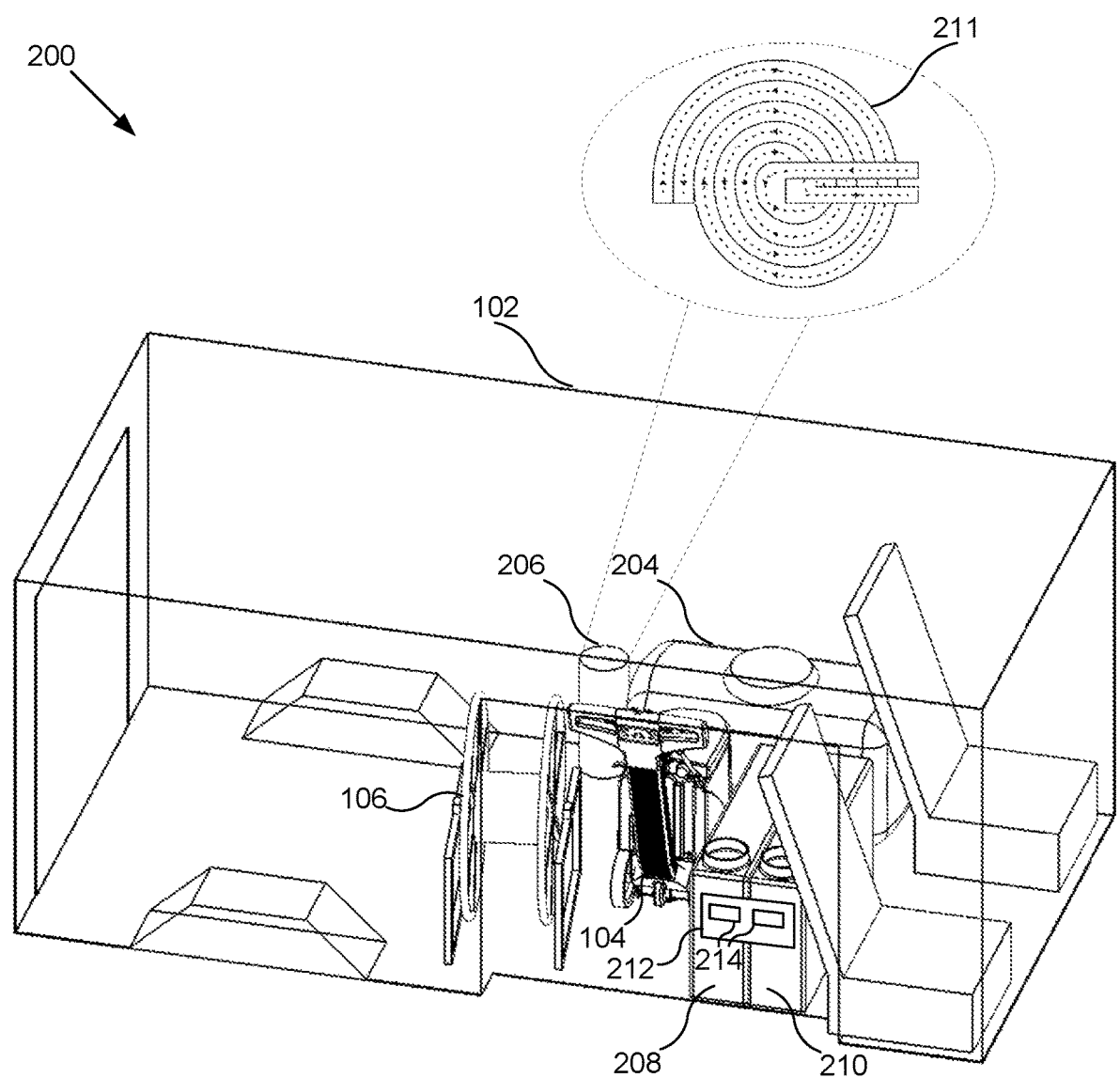
FIG. 2 is a perspective view diagram illustrating another embodiment of the system.
Figure 3:
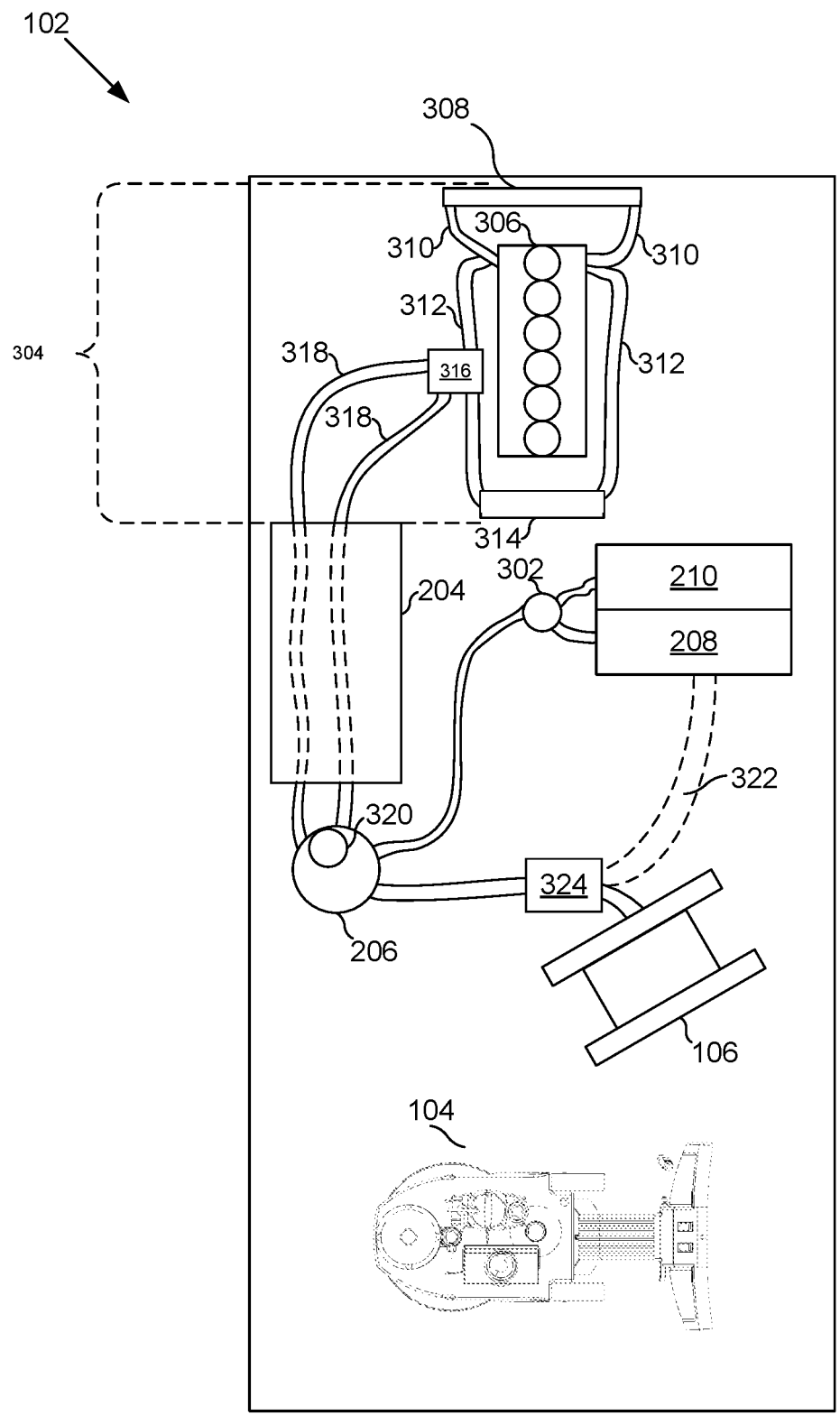
FIG. 3 depicts the vehicle and one example of floor cleaning equipment arranged inside of the vehicle.

FIGS. 2 and 3 depict the vehicle 102 and one example of floor cleaning equipment arranged inside of the vehicle 102. FIG. 2 illustrates a transparent vehicle 102 to give one example of an arrangement for transporting cleaning equipment. The vehicle 102 may include a waste tank 204, a heat exchanger 206, a first solution tank 208, a second solution tank 210, the cleaner 104, and the hose reel 106.

The waste tank 204, and solution tanks 208, 210, may be formed of a rotationally molded plastic, such as polyethylene or polypropylene. The tanks 204, 208, 210 need only be capable of maintaining a quantity of fluid, and not necessarily capable of withstanding vacuum forces because, as described above, fluids are pushed between the cleaner 104 and the vehicle 102. As such, the tanks 204, 208, and 210 may be lighter and cheaper to manufacture.

The first and second solution tanks 208, 210 may store cleaning solutions, for example. One example of a cleaning solution capable of use in the solution tanks 208, 210 is a carpet cleaning chemical solution. The first and second solution tanks 208, 210 may store a single common cleaning solution, or alternatively, different solutions. For example, a cleaning solution may be stored in either the first or second solution tank 208, 210, while the other tank stores a protectant solution. Either solution may be selected and delivered to the cleaner 104 for cleaning a carpet. A pump 302 (see FIG. 3) pushes fluid from one or both solution tanks 208, 210 to the heat exchanger 206. In one embodiment, the pump 302 is a 12 VDC positive displacement 3 chamber diaphragm pump capable of producing a pressure of about 100 psi.

The heat exchanger 206 is fluidly coupled with a vehicle cooling system 304 of the vehicle 102. The vehicle cooling system 304 functions to maintain a proper operating temperature of a motor 306. As one of skill in the art will recognize, the vehicle cooling system 304 generally includes a radiator 308 coupled with the motor 306 via hoses 310 which circulate coolant. The coolant travels through channels within the motor 306 and absorb heat generated by internal combustions. The coolant is cooled by passing through the radiator after which the coolant again cycles through the motor 306. The vehicle cooling system 304 also functions to heat or cool the interior of the vehicle 102. Hoses 312 transport coolant through a heater core 314 which blends the heat from the coolant fluid with air to heat the air inside the vehicle 102.

In one embodiment, the heat exchanger 206 is thermally coupled with the vehicle cooling system 304 via a diverter 316 which circulates coolant fluid from the motor 306 through hoses 318 to the heat exchanger 206 and back to the motor 306. Pump 302 pushes fluid from the solution tanks 208, 210 through the heat exchanger 206 to heat the fluid. The heat exchanger 206 transfers heat from coolant in the hoses 318 to the fluid from the solution tanks 208, 210 without mixing the coolant and the fluid. On example of a heat exchanger includes, but is not limited to, a spiral heat exchanger 211. The spiral heat exchanger is a helically coiled tube configuration of physically separated but adjacent channels through which the coolant and fluid flow. The material separating the adjacent channels is thermally conductive, and therefore, heat transfers from the hotter liquid (the coolant) to the cooler liquid (the cleaning fluid).

The heat exchanger 206 is capable of heating cleaning fluid to a temperature of between about 165 and 205 degrees Fahrenheit. In a further embodiment, the heat exchanger 206 is capable of heating cleaning fluid to a temperature of between about 175 and 195 degrees Fahrenheit. The heat exchanger 206, in one example, is capable of heating the cleaning solution to the above described temperatures at a flow rate of between about 0.25 and 0.75 gallons per minute. In another embodiment, the heat exchanger is capable of heating a cleaning solution at a flow rate of about 0.5 gallons per minute.

A pump 320 circulates the coolant of the vehicle cooling system 304, and may be positioned within the heat exchanger 206, or alternatively anywhere along the pathway of the coolant. For example, the pump 320 may be integrated with the diverter 316. The pump 320, in one embodiment, is a 12 VDC, ⅕ hp centrifugal hot water pump.

After the pump 302 pushes cleaning fluid through the heat exchanger 206, the cleaning fluid may be directed through the hoses on the reel 106 and subsequently to the cleaner 104. A control panel 212 may be in electrical communication with and capable of engaging the pumps 302, 320, and/or the diverter 316. Switches 214 on the control panel 212 may turn on or off the pumps 302, 320, and the diverter 316. As such, a user is able to disengage the heat exchanger 206 from the vehicle cooling system 304 by engaging the diverter 316 and blocking the flow of coolant through the heat exchanger 206.

In another example, the user may direct the pump 302 to pump fluid from one or both solution tanks 208, 210. If, for instance, the first solution tank 208 maintains a cleaning solution, and the second solution tank 210 maintains a premium additive, the user may select one or both solutions based on the preferences of the user. In a further embodiment, numerous multiple solution tanks 208, 210 may be implemented within the vehicle 102, with each solution tank maintaining a different cleaning agent. A user may also select, on the control panel 212, a preferred cleaning solution temperature by adjusting the flow rate of one or both pumps 302, 320.

In another embodiment, a re-circulating hose 322 may be used to return the liquid that passed through the heat exchanger 206 back into the solution tanks 208, 210. The re-circulating hose 324 may be controlled by the main controller or a separate valve or switch 324 may be used to switch the system between a pre-heating mode (liquid flows through the re-circulating hose 322) or a cleaning mode (liquid flows through hose reel 106 and to the cleaning device 104). For example, while the cleaning vehicle is in route to a specific destination, the system may be in pre-heat mode and the liquid may circulate between the solution tanks 208, 210 and the heat exchanger 206.

While in pre-heat mode, the system may heat the solutions to the desired cleaning temperature before the cleaning process begins. In one embodiment, since the solution has been pre-heated, the vehicle may be turned off and the vehicle's engine does not have to idle during the cleaning process. The re-circulating hose 322 may be the same hose or a portion of the same hose that goes to the hose reel 106, whereby the re-circulating hose 322 simply includes a connection system that can be quickly and easily attached and detached.

Figure 4:
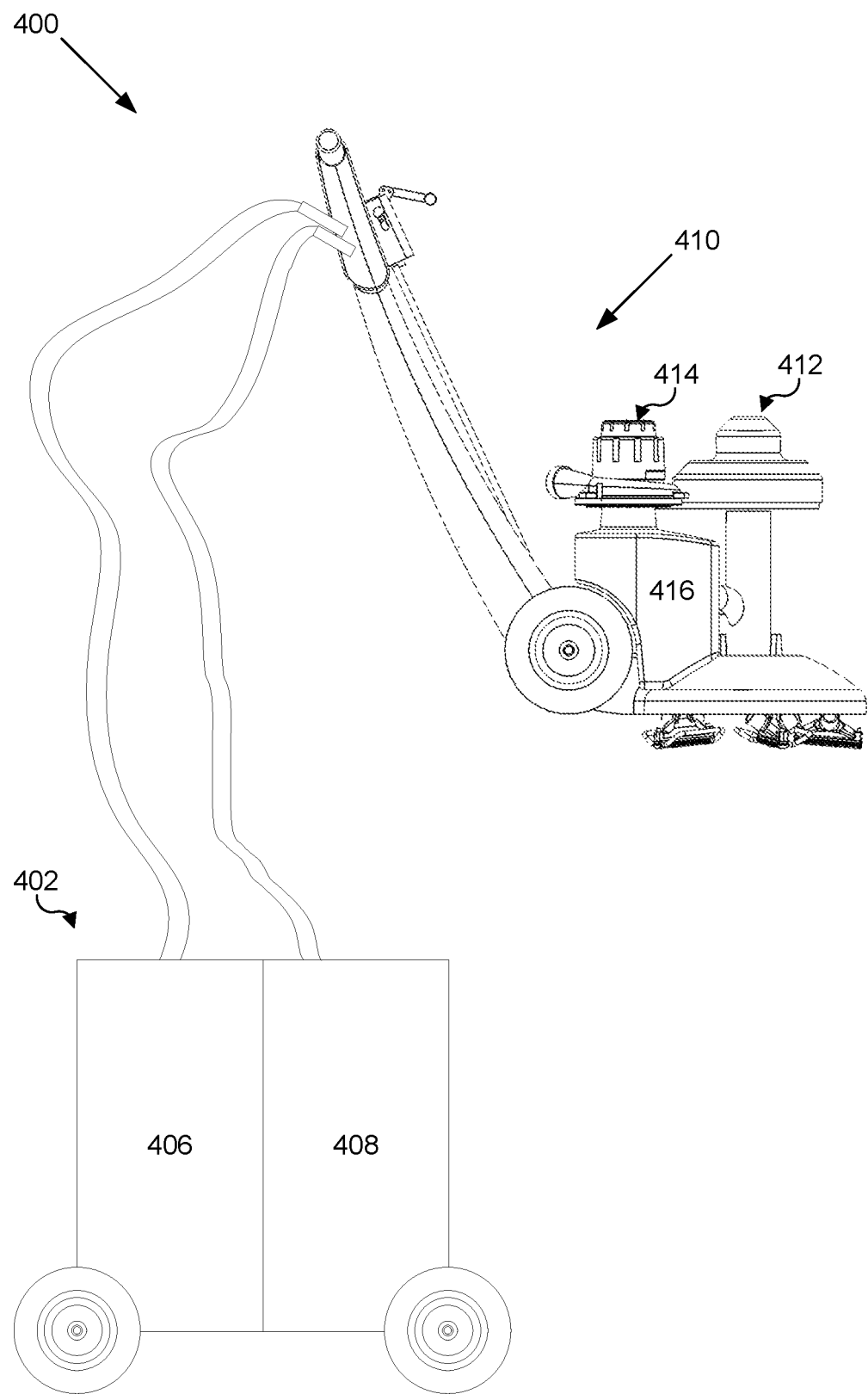
FIG. 4 is a diagram illustrating an alternative embodiment of the system for a rotary head cleaner.

FIG. 4 is a diagram illustrating an alternative embodiment of the system 400 for a rotary head cleaner. In an alternative embodiment, the system may be implemented using a portable base 402 instead of an internal combustion vehicle. The portable base 402 may have solution tanks 404, 406, similar to the solution tanks described above with reference to FIGS. 2 and 3. A pump (not shown) may be implemented inside the portable base in a manner similar to the pump 302 of FIG. 3, in that the pump is configured to push cleaning fluids from one or both solution tanks 406, 408 to the cleaner 410.

In a further embodiment, an electrical heater may be connected with the tanks 406, 408 to heat the cleaning solution. The portable base 402, in one embodiment, is a modular cart 402. In other words, the cart 402 may be configured as a framework capable of receiving modular components such as the tanks 406, 408. As desired, tanks 406, 408 may be removed from the cart and replaced with a different modular component.

The portable base 402 may be powered with an electrical cord for accessing 110 V or 220 V electricity on the premises. In one embodiment, the electrical characteristics of both the portable base 402 and the cleaner 410 are selected to keep the electricity usage from exceeding an amount that might exceed the capacity of the power supply. For instance, a rotary motor 412 and a vacuum motor 414 are preferably selected to have a combined current usage within a selected threshold level. In a further embodiment, an evacuation pump 416 is also selected to combine with the rotary motor 412 and the vacuum motor 414 to maintain a current usage within the selected threshold.

In one embodiment, the selected threshold is within the range of between about 10 and about 22 amps. In a further embodiment, the selected threshold is within the range of between about 12 and about 18 amps. In a more specific embodiment, the selected threshold is about 15 amps.

Figure 5:
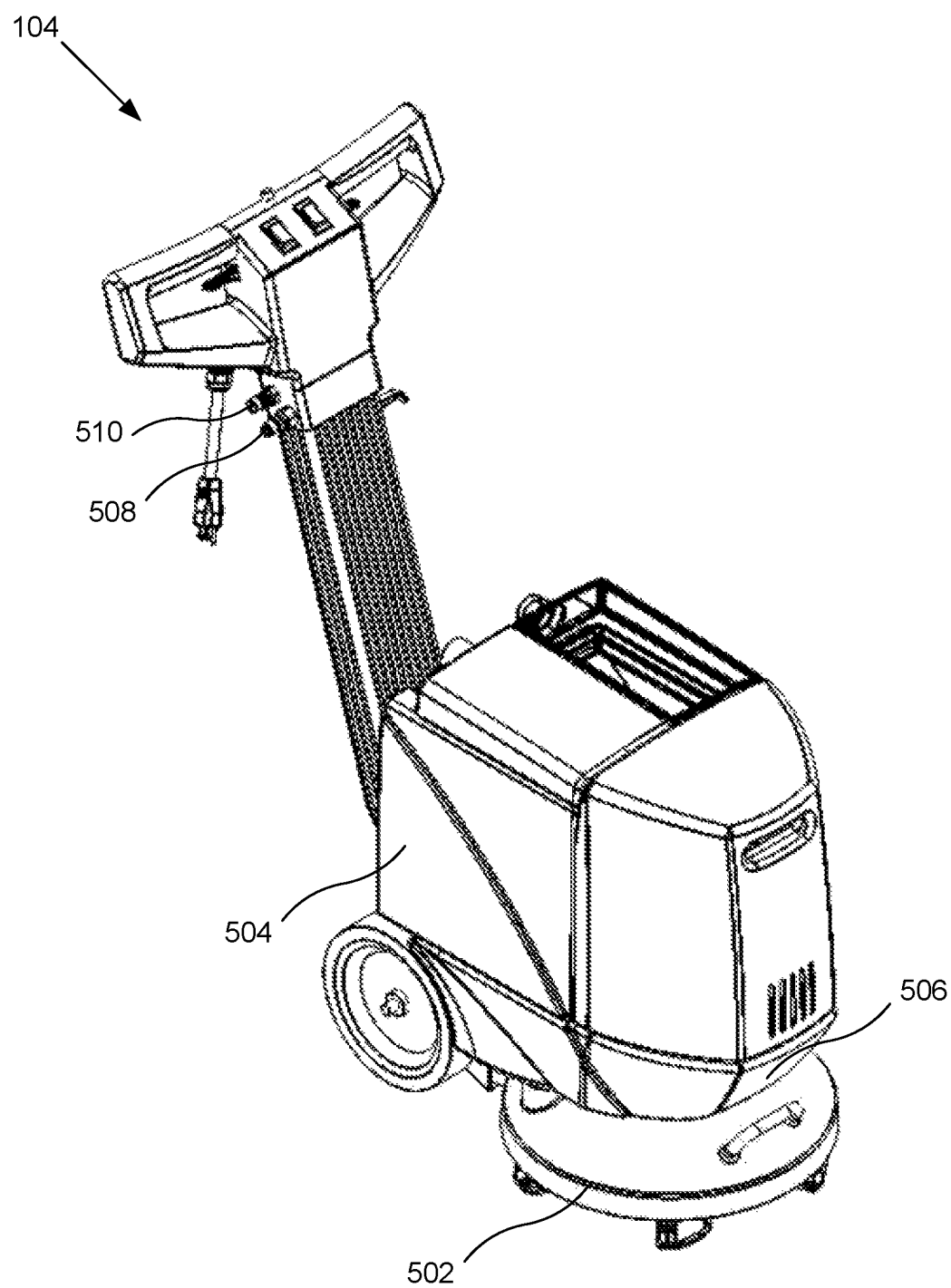
FIG. 5 is a perspective view diagram illustrating one embodiment of a rotary head cleaner capable of use with the system.

FIG. 5 is a perspective view diagram illustrating one embodiment of a rotary head cleaner 104 capable of use with the system described above. The cleaner 104 includes an evacuation tank 504 that surrounds the various motors, pumps, and other components of the cleaner. These components and features include a housing 502 that supports an evacuation tank 504, and various motors. The housing 502 is disposed between the rotary head and the evacuation tank 504. In one embodiment, the cleaner 104 includes a base 506 disposed between the housing 504 and the evacuation tank. The base 504 couples the evacuation tank 504 to the housing 502, and includes mounting areas for various motors and sensors as will be described below. The evacuation tank 504 surrounds the vacuum motor, rotary motor, and other components. This type of arrangement allows the weight of evacuated fluid to be evenly distributed across the base 506 and housing 502, and thereby maintains lateral balance of the cleaner 104.

The cleaner 104 also includes an inlet port 508 and an outlet port 510. The inlet port 508 is for receiving a supply line of cleaning solution. Similarly, the outlet port 510 is for expelling extracted dirt and fluid from a floor surface. The cleaner 104 is configured to "push" the extracted fluid from the evacuation tank 504 to a secondary storage tank or drain. In other words, unlike other cleaning systems, the cleaner 104 does not utilize vacuum to draw the extracted fluid to the secondary storage tank, the extracted fluid is pumped. Likewise, cleaning solution delivered through the inlet port 508 is also pumped to the cleaner 104 instead of using a vacuum to draw the cleaning solution from a cleaning solution tank.

Figure 6:
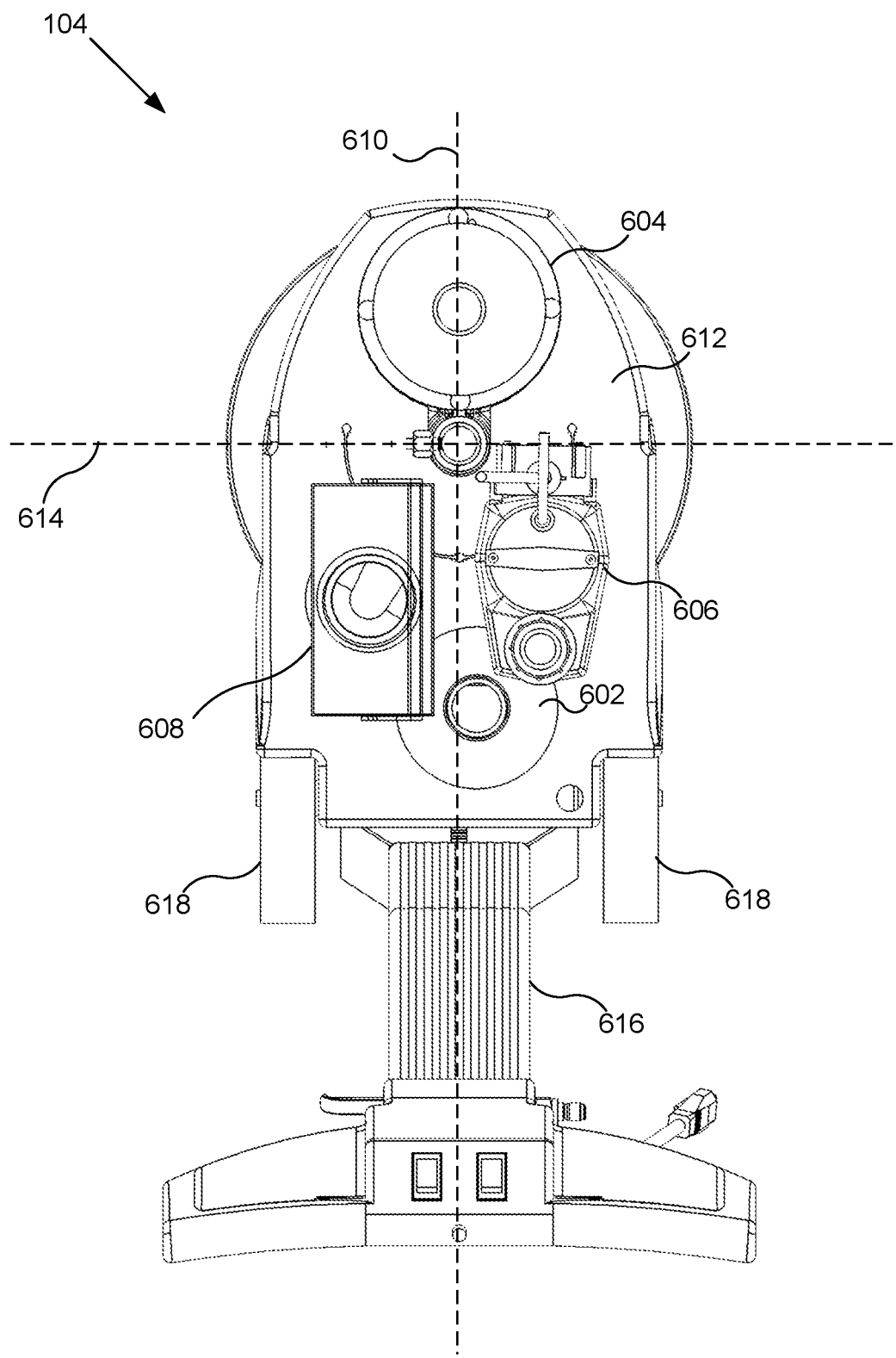
FIG. 6 is a top view diagram illustrating another embodiment of the cleaner.

FIG. 6 is a top view diagram illustrating one embodiment of the cleaner 104. FIG. 6 depicts an embodiment of a laterally balanced cleaner 104. For the sake of clarity, many components depicted above in FIG. 5 are not illustrated; rather the components that most affect lateral balance are illustrated, those components being the vacuum motor 602, the rotary motor 604, the evacuation pump 606, and vacuum riser 608. The arrangement depicted here illustrates a configuration that laterally balances the components along a longitudinal plane 610 of the cleaner 104. The longitudinal plane 610, as used herein, refers to an imaginary plane bisecting the machine along a lateral center of gravity. In other words, the longitudinal plane 610 is positioned along a line defined at each point of the line as the lateral, or side-to-side, center of gravity. By centering the rotary motor 604, and balancing the evacuation pump 606, vacuum motor 602, and vacuum riser 608 along the longitudinal plane 610, the cleaner 104 is balanced and does not lean to one side or the other during operation. The evacuation tank is not depicted here, because as described above, the evacuation tank evenly distributes the weight of extracted fluid across the base 612.

In a different embodiment, the rotary motor 604, vacuum motor 602, and evacuation pump 606 are positioned in any configuration that balances the cleaner 104 laterally. In other terms, the motors and pump may be positioned on the machine in positions that are not necessarily on the longitudinal axis 610 but still balance the machine laterally.

In a further embodiment, the rotary motor 604 is selected and positioned to balance the cleaner 104 longitudinally. As used herein, balancing the machine longitudinally refers to a substantially even weight distribution from one side of an imaginary plane 614 bisecting the machine along a longitudinal, or front-to-back, center of gravity. The rotary motor 604, in one embodiment, is positioned in a forward position, as depicted, to balance the weight of the handle 616 and the wheels 618. Such a balanced configuration enables the cleaner 104, when in operation, to be supported entirely by the rotary head, as depicted in FIG. 1, without the need to utilize the wheels 618.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system for exchanging heat with at least a coolant and a cleaning solution, the system comprising:
    a vehicle having an engine and a cooling system for circulating a coolant;
    a diverter fluidly coupling the cooling system and a heat exchanger, and configured to divert the coolant through the heat exchanger;
    a first pump disposed downstream from the diverter configured to pump the coolant through the heat exchanger and back to the diverter, where the first pump is not mechanically driven by the engine;
    at least one cleaning solution tank;
    a second pump configured to pump the cleaning solution through the heat exchanger so that the heat exchanger heats the cleaning solution without mixing the coolant and the cleaning solution, where the heat exchanger comprises a spiral heat exchanger having pair of adjacent three-dimensionally helically coiled channels and a thermally conductive material disposed between the channels, and where the pair of channels comprises a first channel configured to transport the coolant and a second channel configured to transport the cleaning solution;
    a re-circulating hose fluidly coupled at a first end with a cleaning solution tank and fluidly coupled at a second end with a valve disposed downstream of the heat exchanger, and in fluid receiving communication with the cleaning solution pumped through the heat exchanger, and wherein the valve, in response to a command from a controller, directs the flow of the cleaning solution to the cleaning solution tank instead of a rotary head cleaner, and where the second pump continuously recirculates the cleaning solution through the heat exchanger and the cleaning solution tank until the valve directs the flow of the cleaning solution to the rotary head cleaner; and
    where the rotary head cleaner is in fluid communication with the heat exchanger for receiving the cleaning solution and applying the cleaning solution to a floor, wherein the rotary head cleaner further comprises:
        a housing;
        a vacuum motor to create a vacuum for extracting the cleaning solution from the floor;
        a pump to push the extracted cleaning solution to a waste tank on the vehicle; and
        an evacuation tank surrounding the pump and disposed on the housing.

2. The system of claim 1, wherein the evacuation tank is coupled to a base such that a first longitudinal plane defining a first lateral center of gravity of the evacuation tank aligns with a second longitudinal plane defining a second lateral center of gravity of the base.

3. The system of claim 1, wherein the second pump is fluidly coupled with the rotary head cleaner.

4. The system of claim 1, further comprising a third pump fluidly coupled with the rotary head cleaner.

5. The system of claim 1, further comprising hoses coupling the vehicle with the rotary head cleaner, wherein the hoses are formed having smooth inner wall surfaces.

6. The system of claim 1, wherein the pump is configured to pump cleaning solution through the heat exchanger at a rate of between 0.25 and 0.75 gallons per minute.

7. The system of claim 1, wherein the pump is configured to pump cleaning solution through the heat exchanger at a rate of 0.5 gallons per minute.

8. A carpet cleaning apparatus comprising:
    a vehicle comprising
        an engine, a radiator in fluid connection with the engine, and a coolant circulated between the engine and the radiator;
        a heat exchanger having a heat-receiving pathway and a heat-transferring pathway;
        a first diverter in fluid connection between the engine and the radiator and configured to divert the coolant through the heat exchanger heat-transferring pathway prior to passing through the radiator;
        a cleaning solution tank containing cleaning solution and in fluid connection with the heat exchanger heat-receiving pathway;
        a first pump configured to pump the cleaning solution through the heat exchanger heat-receiving pathway, and
        a waste tank;
    a rotary head cleaner in fluid communication with the heat exchanger heat-receiving pathway to receive cleaning solution and comprising
        a rotary head configured to dispense cleaning solution to a floor;
        an evacuation tank for receiving extracted cleaning solution and in fluid connection with the waste tank;
        a vacuum motor to create a vacuum configured to extract the cleaning solution from the floor; and
        a pump configured to push the extracted cleaning solution to the waste tank; and a valve disposed between the heat exchange heat-receiving pathway and the rotary head cleaner and configured to selectively divert cleaning solution to the cleaning solution tank when the cleaning solution is in a preheating mode and to the rotary head cleaner when the apparatus is in a cleaning mode.

* * * * *